UNITED STATES PATENT OFFICE.

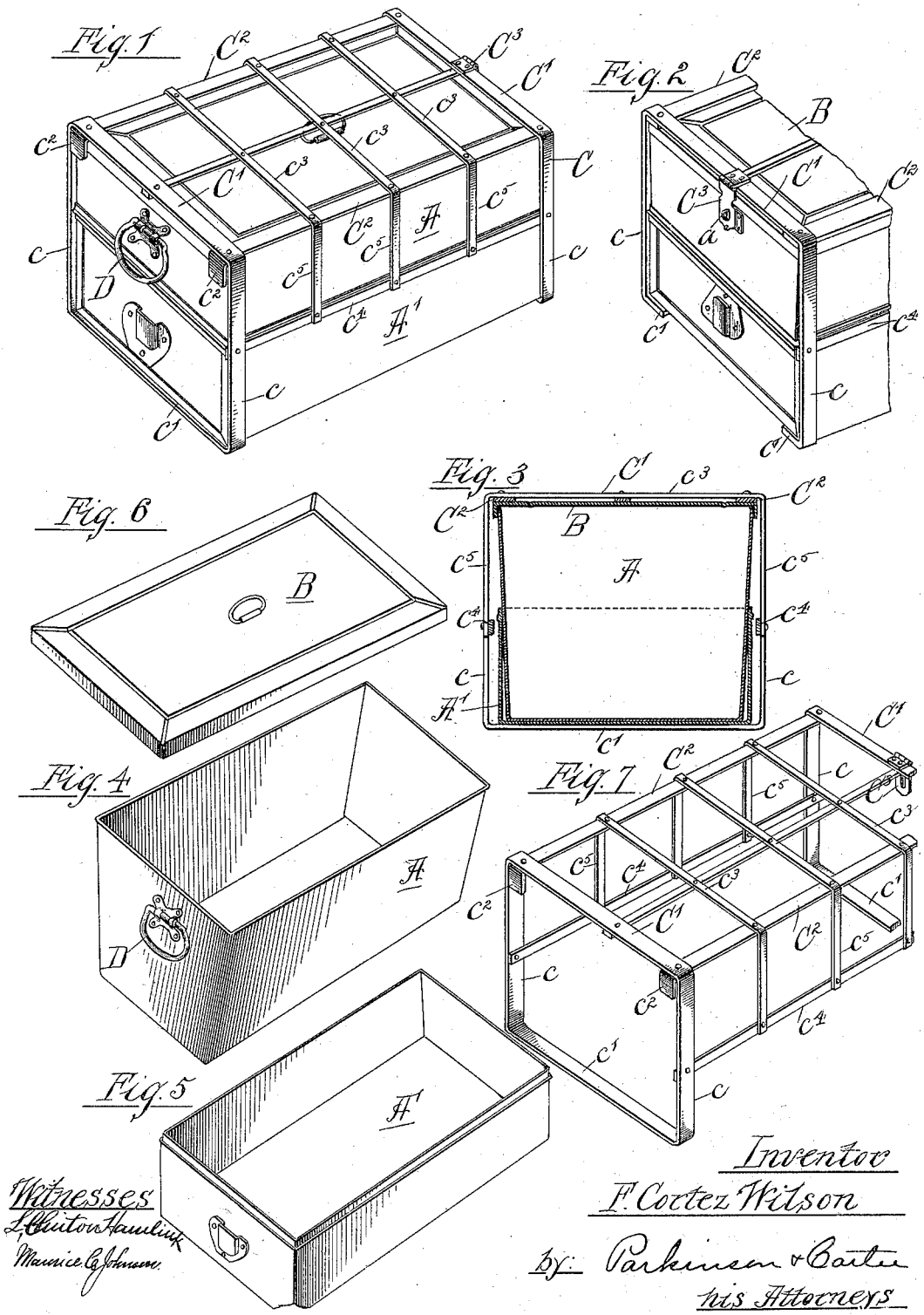

F CORTEZ WILSON, OF CHICAGO, ILLINOIS.

CAMP COOKING OUTFIT.

SPECIFICATION forming part of Letters Patent No. 555,990, dated March 10, 1896.

Application filed November 23, 1895. Serial No. 569,918. (No model.)

*To all whom it may concern:*

Be it known that I, F CORTEZ WILSON, of Chicago, in the county of Cook and State of Illinois, have invented certain new and useful Improvements in Camp Cooking Outfits, of which the following is a specification.

My invention relates to portable cooking kits, for military use and general camping purposes, of the kind designed to supply a boiler and oven, and a metallic fire-jack for supporting said boiler or oven and other cooking utensils above the fire, and which fire-jack is furthermore adapted to form an inclosing and protecting crate within which the boiler and oven and various utensils may be packed for transportation.

The object of the invention is to provide an improved construction in devices of the character referred to; and it consists in the matters hereinafter set forth and particularly pointed out in the appended claims.

In the accompanying drawings, Figure 1 is a perspective view of a cooking outfit constructed in accordance with my invention, showing the same as packed ready for transportation. Fig. 2 is a similar view of the opposite end thereof. Fig. 3 is a transverse sectional view of the device. Figs. 4, 5, and 6 show perspective details of the pan-sections and cover. Fig. 7 is a perspective view of the fire-jack alone.

A designates a pan-section, which is or may be of about the full height of the kit when packed, except for the inclosing frame or casing, and A' is a second pan-section of any suitable height into which the first is nested and which is adapted to be inverted and shut into or upon the first section to form a closed oven. Either of these pan-sections may serve as a boiler or kettle when in use in camp, and when packed for transportation the inner section, or it may be the only section, forms a receptacle within which may be packed various pots, dishes, and other utensils as desired. A cover B serves to close such receptacle and protect its contents.

To provide an open stove or fire-jack for the support of the pans or oven when in use and for a surrounding crate or casing to inclose the pans and contents during transportation, I employ a skeleton metallic frame C, which may be conveniently formed with end bars $C'$, that are placed at a distance apart corresponding to the length of the pan and are united by lateral bars $C^2$, which extend along the upper lateral edges of the pan or pan-sections. Said end bars, $C'$, are turned down, as at $c$, to extend down the sides of the pan or pan-sections and form supporting-legs, and at the bottom of said pan or pans are turned inwardly, as at $c'$, beneath the said pan section or sections to inclose and support the same. In the construction shown in Figs. 1, 3, and 7 said inwardly-bent ends opposite depending legs $c$ are carried from side to side and joined continuously to each other, and thereby increase the rigidity of the structure by preventing the legs from springing. In some cases, however, said inturned ends $c'$ may be cut off, as shown in Fig. 2, so as to separately extend beneath the pans only such distance as may be necessary to properly inclose the same and to afford feet of sufficient bearing-surface to prevent the jack from sinking into the ground under the weight of the utensils and cooking materials placed upon it when in use.

The lateral bars, $C^2$, are turned over at one end a sufficient distance to form stops $c^2$ and to practically close that end of the frame against the passage of the pan-sections. The other end of the frame is left open for their introduction, and the length of the frame is made such that when said sections are inserted and pushed home until they abut against the stop $c^2$ at one end their opposite end will be practically flush with the end of the frame.

The top portions of the end bars, $C'$, and the lateral bars, $C^2$, are stayed by cross-straps $c^3$, thus forming a grated or latticed top to the fire-jack, while the depending legs $c$ are tied together by one or more lateral straps $c^4$, which may be supported at suitable points by hangers $c^5$ formed by continuations of the cross-straps $c^3$ of the top. Obviously, moreover, these hangers may be continued downwardly beneath the bottom of the pan to form additional supports if so desired.

That end of the pan or pan-sections which abuts against the closed end or stops of the fire-jack, when packed together, is provided with a handle D, so that the entire kit may be carried by said handle, the frame or fire-jack then inclosing and holding the pans together and being retained thereon by the stops, which come uppermost in this position owing to the location of the handle with relation thereto. The opposite end of the pan or pan-sections is furthermore provided with a staple $a$, and the corresponding open end of the fire-jack is provided with a hinged hasp $C^3$, which when open leaves said end of the frame free for the introduction of the pans but when closed shuts down over the hasp $a$ and is retained by a padlock D or any suitable fastening device which will render the outfit secure against intermeddling. With this construction it is evident that either one or both pan-sections may be carried, that the loss of the outer pan-section does not detract from the efficiency of the device as a portable package, and that even if the inner pan-section is lost while the outer is retained the latter may form the bottom of a package which is effectively tied together and retained by the inclosing frame or fire-jack.

I do not intend to limit myself to the exact form or proportions of the parts herein described nor to the precise construction of the fire-jack; but

What I claim, and desire to secure by Letters Patent, is—

1. The combination with one or more pan-sections of an independent skeleton metallic inclosing frame or fire-jack having a grated top, sides which depend to and are turned beneath the bottom of the exposed pan-section to embrace and support it, stops on said frame or jack at one end to bar the passage of the pan-section, and a free opposite end.

2. The combination with one or more pan-sections one of which has a handle on one end, and a staple at the other, of an independent skeleton metallic inclosing frame having grated depending sides turned in at their lower ends to embrace and support the exposed pan-section, stops on said frame or jack at one end against which the handle end of the pan-section abuts, and a hasp at the other open end arranged to take over the staple on the pan-section.

F CORTEZ WILSON.

Witnesses:
GEO. LANDIS WILSON,
MAURICE JOHNSON.